United States Patent [19]

Vermeulen

[11] Patent Number: 4,665,464
[45] Date of Patent: May 12, 1987

[54] ADJUSTABLE ELECTROMECHANICAL DEVICE

[75] Inventor: Freddy J. Vermeulen, Roeselare, Belgium

[73] Assignee: U.S. Philips Corporation, New York, N.Y.

[21] Appl. No.: 812,150

[22] Filed: Dec. 23, 1985

[30] Foreign Application Priority Data

Dec. 24, 1984 [NL] Netherlands .......................... 8403930

[51] Int. Cl.⁴ .......................... H01G 5/06; H01H 3/08
[52] U.S. Cl. ...................................... 361/293; 200/336
[58] Field of Search .................... 24/274; 16/229, 262, 16/263, 386; 361/437, 293; 200/336

[56] References Cited

U.S. PATENT DOCUMENTS

| | | | |
|---|---|---|---|
| 2,835,359 | 5/1958 | Boldt et al. ............................ | 16/262 |
| 3,500,147 | 3/1970 | Hirschberg ........................ | 361/293 |
| 4,296,292 | 10/1981 | Schuberth et al. .................. | 200/336 |

FOREIGN PATENT DOCUMENTS

| | | | |
|---|---|---|---|
| 745123 | 2/1956 | United Kingdom ............. | 24/274 R |
| 914349 | 1/1963 | United Kingdom ............. | 24/274 R |

Primary Examiner—Donald A. Griffin
Attorney, Agent, or Firm—Marc D. Schechter

[57] ABSTRACT

An adjustable electromechanical device, such as a potentiometer, a variable capacitor or a multiple switch, comprising a shaft which is rotatably mounted in a sleeve. The shaft is retained in the axial direction by an annular wall portion of the bearing sleeve at the free end of the sleeve, the annular wall portion is spaced from the remainder of the sleeve by at least one but preferably two evenly distributed slots which extend circumferentially in the wall of the sleeve. The annular wall portion remains connnected to the remainder of the bearing sleeve at at least one location. The free parts of the annular portion are deformed to engage a circumferential groove in the shaft.

2 Claims, 6 Drawing Figures

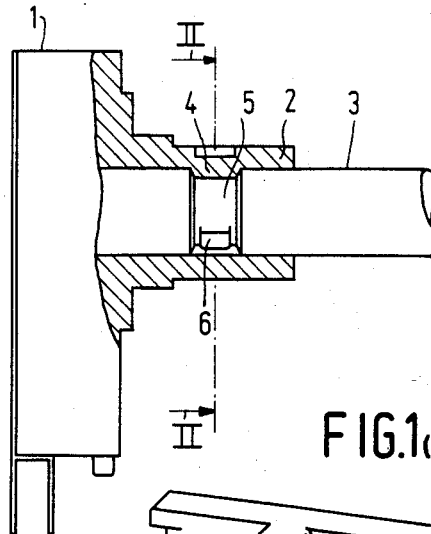
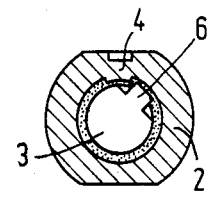
FIG.1 (PRIOR ART)　　FIG.2 (PRIOR ART)
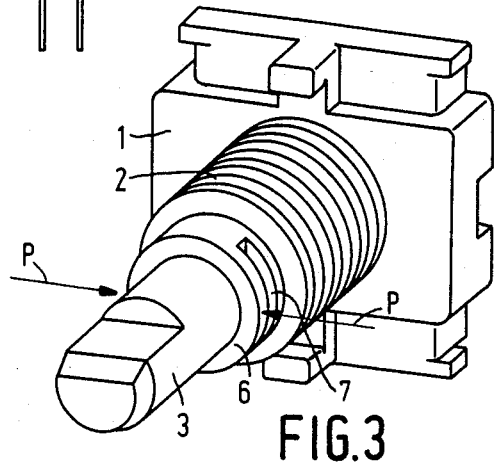
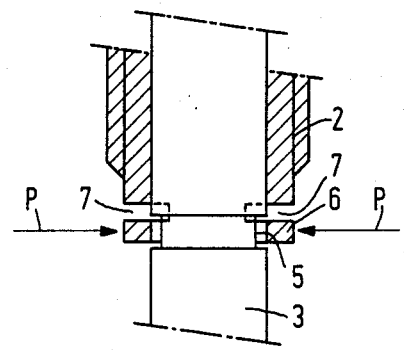
FIG.3　　FIG.4
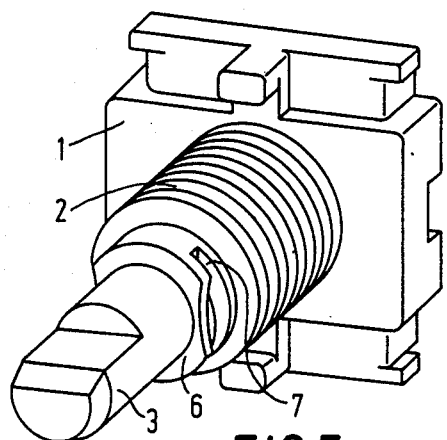
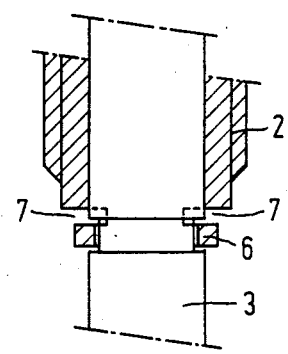
FIG.5　　FIG.6

ADJUSTABLE ELECTROMECHANICAL DEVICE

BACKGROUND OF THE INVENTION

The invention relates to an adjustable electromechanical device in a housing. The device comprises a shaft which is rotatably mounted in the housing. The shaft carries one or more contact elements and is jounalled in a cylindrical bearing sleeve. Axial movement of the shaft is prevented by the cooperation of at least one projection on the bearing sleeve with a circumferential groove in the shaft.

Such a device which may be a potentiometer, a variable capacitor or a multiple switch, is described in German Patent Application No. 2,850,835 (corresponding to U.S. Pat. No. 4,296,292). In this known device, the projection is formed on the bearing sleeve by deforming the wall of the sleeve form the outside of the sleeve. Consequently, the precision with which the projection is reproduced at the inner side of the bearing sleeve is not very high. The grooved shaft must be capable of moving loosely relative to the projection, yet without too much play.

The known device is depicted in FIGS. 1 and 2 of the accompanying drawing. FIG. 1 is a partly-sectional side view and FIG. 2 is a sectional view along the line II—II of FIG. 1.

In these FIGS. 1 and 2, reference numeral 1 represents the housing of the known device and 2 a bearing sleeve in which a shaft 3 can rotate. On the inner side of the bearing sleeve 2 there is a projection 4 which is obtained by deforming the wall of the sleeve 2 from the outside of the sleeve 2. The projection 4 slides in a circumferential groove 5 in the shaft 3. A stop 6 is formed in the bottom of the groove 5 in shaft 3.

It will be clear that it is very difficult to obtain a projection 4 which fits correctly in the groove 5. Without a correct fit there is a fair chance that the projection 4 will jam in the groove 5. Obviously, this also depends on the material chosen for the bearing sleeve 2.

An interesting feature of the known version is that the projection forms an integral part of the bearing sleeve.

SUMMARY OF THE INVENTION

It is an object of the invention to provide an integrated projection which fits correctly in the groove in the shaft, without jamming.

In the electromechanical device according to the invention near a free end of the bearing sleeve the wall of the sleeve is provided with one circumferentially extending slot or a plurality of centrosymmetrical circumferentially extending slots. The slots form an annular wall portion. The annular wall portion remains connected to the remainder of the bearing sleeve at at least one location. The width of the annular wall portion corresponds to that of the annular groove. The part or parts of the annular wall portion which are spaced from the remainder of the sleeve by the slot or slots is deformed to engage in the circumferential groove to an extent such that the part or parts of the annular wall portion remain just clear of the bottom of the groove.

BRIEF DESCRIPTION OF THE DRAWING

FIG. 1 is a perspective view of the assembled device with the shaft not yet axially retained in the bearing sleeve.

FIG. 4 is an axial sectional view of part of the bearing sleeve, with the shaft inserted but not yet axially retained in the sleeve.

FIG. 5 is a perspective view as in FIG. 3, but with the shaft axially retained in the bearing sleeve.

FIG. 6 is a sectional view as in FIG. 4, but with the shaft axially retained in the bearing sleeve.

In FIGS. 3-6, reference numeral 1 represents the housing of the device. A bearing sleeve 2 supporting a shaft 3 is secured. Near the free end of the bearing sleeve 2, the wall of the sleeve is provided with two centrosymmetrical slots 7. Slots 7 are evenly distributed about the axis of the bearing sleeve 2. In this case the slots are two diametrically opposed slots. Each slot extends circumferentially in the sleeve to form an annular wall portion 6. The width of wall portion 6 measured in the axial direction corresponds to the width of the circumferential groove 5 in the shaft 3.

FIG. 5 is a perspective view of the device according to the invention, and FIG. 6 is an axial sectional view of part of the bearing sleeve 2 with the shaft 3. The device is obtained from the assembly shown in FIGS. 3 and 4 by exerting a radially inward force on the annular wall portion 6 as indicated by arrows P. The radially inward force deforms the parts of the annular wall portion 6 (which are spaced from the remainder of the sleeve 2 by the slots 7) to engage the circumferential groove 5 in the shaft 3 to an extent such that they will retian the shaft 3 in the bearing sleeve 2 in the axial direction but will remain just clear of the shaft 3 at the bottom of the groove 5.

Radial deformation of annular wall portion is not accompanied by axial deformation because the annular wall portion 6 of the bearing sleeve 2 already has the proper width. Consequently, the portion 6 will not become jammed in the groove. Radial deformation must of course be limited to ensure that the annular portion 6 remains just clear of the shaft 3 at the bottom of the groove 5. However, this will pose no mechanization problems.

Instead of two circumferential slots 7, as described above, one slot may be provided. One of the forces must then be exerted diametrically opposite the free part of the annular wall portion 6 of the bearing sleeve 2. As this diametrically opposite portion is integral with the bearing sleeve 2, the local deformation of sleeve 2 will be negligible as compared with that of the annular wall portion 6.

It is alternatively possible to have more than two slots, for example 3 or 4. However, a construction having more than four slots will be less suitable.

Preferably, the bearing sleeve 2 is made by die casting. For this purpose, zinc alloys or aluminum casting alloys such as "Zamak", (that is a Zn-Al-Mg-alloy) or Al-Si-Mg-alloys are very suitable. The slots are formed during die casting of the sleeve, so that no additional operation is needed.

Another possibility is a brass construction which is machined from the brass sleeve.

In the present construction the shaft 3 is axially restrained for both tensile and compressive forces. The construction according to the invention is capable of withstanding both axial tensile and axial compressive forces up to at least 200 Newtons general requirement for potentiometers is that they should be capable of withstanding both axial tensile forces and axial compressive forces up to 100 N.

What is claimed is:

1. An adjustable electromechanical device comprising:
   a housing having a cylindrical bearing sleeve; and
   a shaft rotatably mounted in the bearing sleeve, said shaft having a circumferential groove therein, said groove having a bottom and a width;
   characterized in that:
   the bearing sleeve has a free end and is provided with at least one circumferential slot near the free end, said slot defining an annular wall portion connected to the sleeve, said annular wall portion having a width corresponding to the width of the groove in the shaft, the annular wall portion being deformed adjacent the slot to engage the groove in the shaft while not contacting the bottom of the groove; and
   the bearing sleeve is a cast alloy, the slots being formed during die casting of the sleeve.

2. An adjustable electromechanical device as claimed in claim 1, characterized in that:
   the sleeve has a longitudinal axis arranged parallel to the rotation axis of the shaft; and
   the bearing sleeve is provided with two circumferential slots arranged symmetrically about the longitudinal axis of the sleeve.

* * * * *